United States Patent [19]

Briggs

[11] Patent Number: 5,268,858
[45] Date of Patent: Dec. 7, 1993

[54] METHOD AND APPARATUS FOR NEGATING AN OPERAND

[75] Inventor: Willard S. Briggs, Dallas, Tex.

[73] Assignee: Cyrix Corporation, Richardson, Tex.

[21] Appl. No.: 753,320

[22] Filed: Aug. 30, 1991

[51] Int. Cl.[5] .............................................. G06F 7/52
[52] U.S. Cl. ...................................................... 364/760
[58] Field of Search .................. 364/760, 715.01, 784, 364/768

[56] References Cited

U.S. PATENT DOCUMENTS

| | | | |
|---|---|---|---|
| 4,520,347 | 5/1985 | Campbell, Jr. | 340/347 DD |
| 4,597,053 | 6/1986 | Chamberlin | 364/760 |
| 4,631,696 | 12/1986 | Sakamoto | 364/748 |
| 4,709,226 | 11/1987 | Christopher | 364/715 |
| 4,719,590 | 1/1988 | Aman | 364/768 |
| 4,748,584 | 5/1988 | Noda | 364/760 |
| 4,866,656 | 9/1989 | Hwang | 364/768 |
| 4,918,640 | 4/1990 | Heimsch et al. | 364/768 |
| 4,935,890 | 6/1990 | Funyu | 364/715.03 |

Primary Examiner—Long T. Nguyen
Attorney, Agent, or Firm—Cyrix Corporation

[57] ABSTRACT

A multiplier system 12 is disclosed which provides for the negation of an operand stored in an operand register 14. When a negative operand must be loaded into a partial product generator 26, a carry bit is selectively generated in carry logic 44 and a selected bit or bits within the partial product is set to zero. During a subsequent pass through the multiplier system 12, a bit is added at a block 46 to provide for the addition of the required quantity for the negation of the operand.

5 Claims, 2 Drawing Sheets

FIG. 1

|A|B|C|D|
|---|---|---|---|
|0|0|0|0|
|0|0|1|1|
|0|1|0|1|
|0|1|1|2|
|1|0|0|-2|
|1|0|1|-1|
|1|1|0|-1|
|1|1|1|0|

FIG. 3

| A | B | | A' | B' | | C |
|---|---|---|---|---|---|---|
| 0 | 0 | ⇒ | 0 | 1 | | 0 |
| 0 | 1 | | 1 | 0 | | 0 |
| 1 | 0 | | 1 | 1 | | 0 |
| 1 | 1 | | 0 | 0 | | 1 |

FIG. 4

| A | B | | A' | B' | | C |
|---|---|---|---|---|---|---|
| 0 | 0 | ⇒ | 1 | 0 | | 0 |
| 1 | 0 | | 0 | 0 | | 1 |

METHOD AND APPARATUS FOR NEGATING AN OPERAND

TECHNICAL FIELD OF THE INVENTION

This invention relates in general to the field of electronic devices and more particularly to methods and systems for negating operands of a carry save adder tree.

BACKGROUND OF THE INVENTION

The implementation of an array multiplier circuit is an important aspect of many modern arithmetic systems. A rectangular aspect ratio array multiplier circuit is disclosed in U.S. Pat. No. 5,144,576, issued on Sep. 1, 1992 entitled "RECTANGULAR ASPECT RATIO SIGNED DIGIT MULTIPLIER" and assigned to the assignee of the present application, the disclosure of which is hereby incorporated by reference. The use of rectangular aspect ratio multipliers allows for the formation of short by long products to expedite the performance of a variety of arithmetic functions such as the square root and division operations described in the previously cited application. The calculation of the product of two full-length operands in a rectangular aspect ratio multiplier involves multiple iterations or passes through the array multiplier.

Most multiplier circuits involve some sort of Booth recoding to limit the required digit set used within the multiplier array. The conventional Booth recoding requires a digit set comprising the digits 2, 1, 0, −1, and −2. This digit set dictates that the partial product generators within the multiplier must have the capability to shift and negate one of the operands of the multiplication operation prior to addition of the partial products within the adder tree comprising the multiplier array.

When utilizing twos complement numbers, an operand is negated by forming the NOT or inverse of the operand and then adding "1" in the least significant bit position. Obtaining the NOT or inverse of the number is not difficult within an adder tree. Adding a "1" in the least significant bit position is a difficult operation because it involves using a full level of an adder circuit to account for any potential carry ripple through the length of a partial product formed using the negated operand. Full adder circuits result in significant propagation delays within the array multiplier and, as such, circuit designers strive to limit the levels of adders required in an array multiplier.

Accordingly, a need has arisen for a system and method for negating an operand in an array multiplier which allows for multiple passes through the array to form a full length product of two operands.

SUMMARY OF THE INVENTION

In accordance with the teachings of the present invention, a method and system for negating an operand are disclosed which substantially eliminate problems and disadvantages associated with prior art systems.

More particularly, a method and system are provided which enable the creation of a carry bit which can be stored between cycles or iterations of a multiplication process. The carry bit enables the necessary addition required by the negation of an operand to be accomplished in two steps. The first step comprises a substraction within a first iteration of the multiplication process and the second step comprises the addition of a sufficient quantity during a subsequent iteration of the multiplication process.

BRIEF DESCRIPTION OF THE DRAWINGS

A more complete understanding of the teachings of the present invention may be required by referring to the Detailed Description of the Invention with reference to the following figures, where:

FIG. 1 is a tabular representation of conventional Booth recoding.

FIGS. 3 and 4 are tabular representations of the logic necessary to create the carry signal used in the method and system of the present invention.

DETAILED DESCRIPTION OF THE INVENTION

Figure 2:
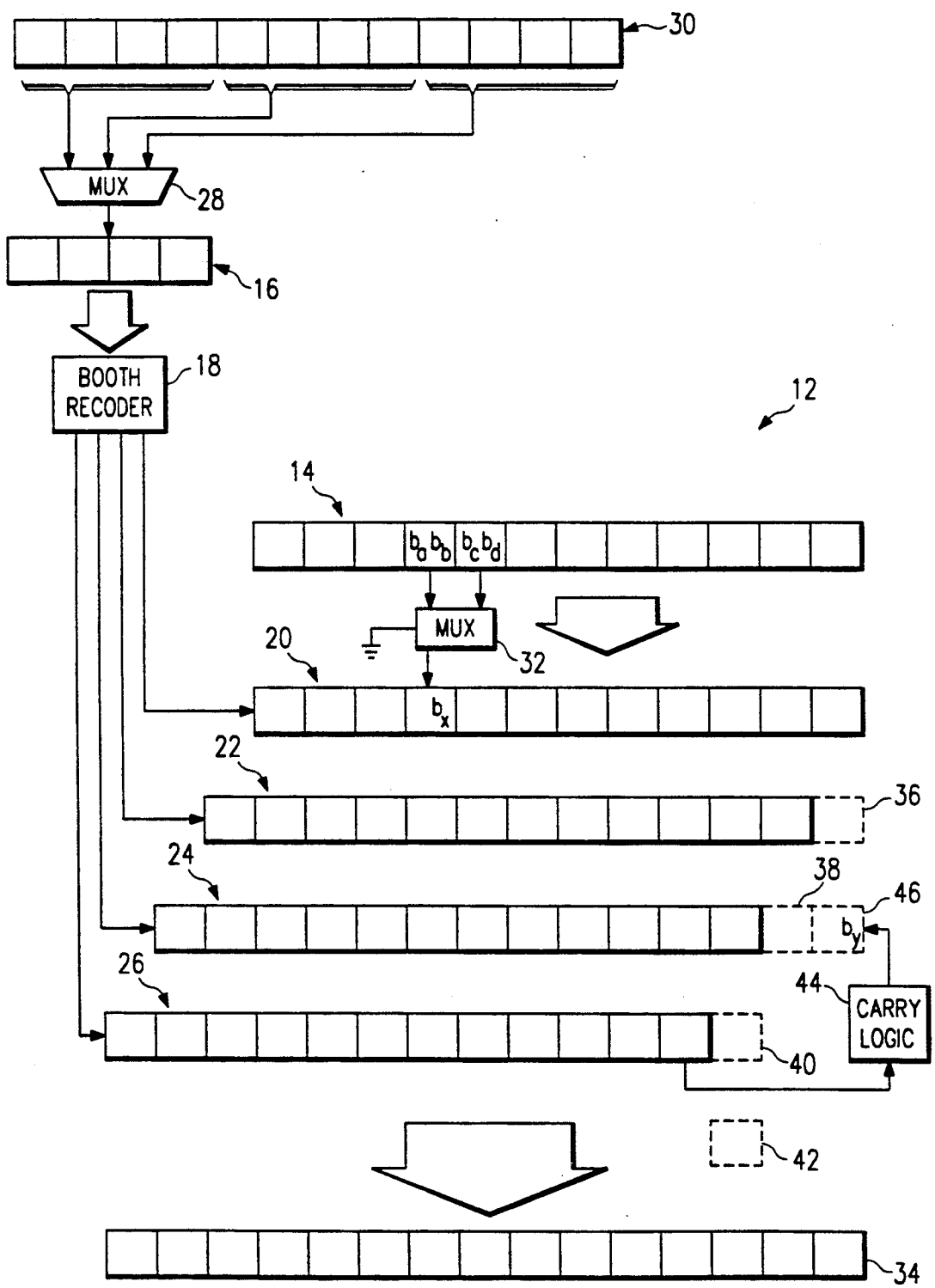
FIG. 2 is a schematic block diagram illustrating a circuit constructed according to the teachings of the present invention.

Referring to FIG. 1, a truth table 10 is illustrated with four columns labeled, respectively, "A", "B", "C", and "D". Table 10 illustrates the method of conventional Booth recoding used in many array multipliers to reduce the required digit set and eliminate the need for a times-three adder. Booth recoding calls for the use of radix four digits within the partial product generators and adder tree of the multiplier array. Referring to table 10, columns A and B comprise the possible combinations of the two bits comprising each radix four digit within the operand to be encoded using Booth recoding. Column C represents the most significant bit of the lesser significant digit resident next to the digit formed by columns A and B. These three bits are used in conventional Booth recoding to generate the digit set shown in column D.

For example, if a radix four digit was comprised of the bits "0" and "1" reading from left to right and the most significant bit of the next least significant digit was a "1", the Booth recoding system would indicate that two times the operand should be loaded into the partial product register and be added to the remainder of the partial products. The advantage of Booth recoding inheres in the fact that the digit set is comprised merely of "0", copies of the operand, shifted copies of the operand, negated copies of the operand, or negated and shifted copies of the operand corresponding to the digit set of "0", "1", "2", "−1", and "−2", respectively. Each of the quantities can therefore be acquired by direct copies, shifted copies or negated copies of one of the operands of the multiplication operation. Hence, the multiplier system comprised of an adder tree, partial product generators, and the Booth recoding system must be able to negate an operand by inverting each bit within the operand and adding "1" in the least significant bit position.

FIG. 2 illustrates a schematic block diagram of an array multiplier system 12 constructed according to the teachings of the present invention. Multiplier 12 comprises an operand register 14 operable to store a full length operand. Operand register 14 is illustrated in FIG. 2 to be operable to store twelve radix four digits or twenty-four bits of information. A short operand register 16 is operable to store the second operand of the multiplication operation performed by system 12 and is illustrated as being operable to store four radix four digits plus the most significant bit of the lesser significant digit or nine bits of information. Short operand register 16 inputs information into a Booth recoder 18 which in turn drives partial product generators 20, 22, 24, and 26. Short operand register 16 receives portions of a full length operand from a multiplexer 28 which selectively couples portions of a full length operand stored in an operand register 30 coupled to the inputs of multiplexer 28. Full length multiplication operations can be performed using a rectangular aspect ratio multiplier by performing a series of short by long multiplication operations as described in U.S. Pat. No. 5,144,576 issued on Sep. 1, 1992 entitled "RECTANGULAR ASPECT RATIO SIGNED DIGIT MULTIPLIER", and assigned to the assignee of the present application, the disclosure of which has previously been incorporated herein by reference. As shown in FIG. 2 at 31, the most significant portion of the operand register 30 is only seven bits long due to the requirements of the Booth recoding format. The implied eighth bit of the operand stored in operand register 30 must be a "0" such that the most significant partial product will be positive. When using conventional Booth recoding, a most significant bit equal to "1" indicates a negative quantity requiring correction in a later iteration. As such, all operands stored in operand register 30 are normalized to be positive quantities allowing for the implied eighth bit 31 to be eliminated from the data path by merely forcing the value of bit 31 to "0" upon input into multiplexer 28.

The full length operand stored in operand register 30 is selectively partitioned using multiplexer 28 and loaded into the short operand register 16 to drive the Booth recoder 18. The Booth recoder 18 instructs the partial product generators 20, 22, 24, and 26 to load and store the appropriate quantities associated with the operands stored in operand register 14. In order to accomplish this function, each bit within the partial product generator 20 is coupled to "0" or ground potential and to two bits within the operand register 14 through a multiplexer circuit such as exemplary multiplexer circuit 32 illustrated in FIG. 2. Bit $b_x$ may selectively be set to the value of bit $b_b$, bit $b_c$, or to "0" depending upon the value received from Booth recoder 18 which encodes the operand stored in short operand register 16 using the table illustrated in FIG. 1 and described previously. Multiplexer 32 also has the ability to load into bit position $b_x$ the inverse of the value of bits $b_b$ or $b_c$. The inverse values of $b_b$ and $b_c$ are necessary in order to load the inverse value of the operands stored in operand register 14 into partial product generator 20. In order to provide, as required by the Booth recoding scheme, the negative or the shifted negative value of the operand stored in operand register 14 a "1" or "2" must be added to the inverse value stored in partial product generator 20.

The values stored in partial product generator 20, 22, 24, and 26 are summed together in an adder tree [not shown] and the sum is output to a product register 34. For purposes of clarity, the adder tree is not shown in FIG. 2. The partial products stored in partial product generators 20, 22, 24, and 26 may be summed using conventional methods. The additional "1" or "2" required to be added to the operand stored in partial product generator 20 may be inserted into the adder tree in the bit locations indicated by block 36 in FIG. 2. A level of the adder tree is already constructed to add the quantities stored in both partial product generators 20 and 22. Therefore, the addition of additional bits in block 36 will not add an additional level to the adder tree. Similarly, if a "1" or "2" must be added to the quantity stored in partial product generator 22, this "1" or "2" may be added by setting either of the bits in block 38 shown in FIG. 2. The addition of block 38 also does not add any additional levels to the adder tree Similarly, a "1" or "2" that must be added to a quantity stored in partial product generator 24 may be added by setting either bit in a block 40 without adding an additional level of the adder tree. A full adder must be used to add the "1" or "2" to the quantity stored in the partial product generators in order to account for any carry ripple which may result from the addition process.

The problem solved by the teaching of the present invention is associated with an addition of "1" or "2" to the quantity stored in partial product generator 26. In order to add a "1" or "2" to this quantity during the present pass through the multiplier system 12 an additional "1" or "2" would have to be set in a block 42 shown in FIG. 2. This method would require the formation of an entire new level of the adder tree and would incur an additional propagation delay through this additional level of the adder tree. According to the teachings of the present invention, this additional level of the adder tree represented by block 42 in FIG. 2 is eliminated through the addition of carry logic 44 and the bit positions associated with a block 46 shown in FIG. 2.

The present invention capitalizes on the fact that a rectangular aspect ratio performs multiple passes through multiplier array 12 in order to form a full product. Accordingly, the addition of the "1" or "2" necessary to form a negative operand in a single partial product generator can be accomplished in stages during the multiple iterations required to form the full product. In this manner, the addition of the "1" necessary to negate an operand may be achieved without the addition of an additional level of the adder tree by performing the necessary additions in a later pass through the multiplier array.

FIG. 3 illustrates in truth table form the method of the present invention used to create a carry bit to communicate the need to account for the negation of an operand during later iterations through the multiplier array 12. Columns A and B in FIG. 3 represent the inverse of the least significant bits within the least significant digit of an operand stored in operand register 14. FIG. 3 represents the transformation performed by the system of the present invention when the Booth recoded operand instructs partial product register 26 to load and store the negative of the operand stored in operand register 14. The first three rows of the truth table shown in FIG. 3 do not result in the generation of a carry bit in carry logic 44.

When the inverse of the least significant bits of the operand stored in operand register 14 both are "0", the necessary addition of a "1" may be accomplished by inverting the least significant bit as shown in the first row of the truth table illustrated in FIG. 3. Similarly, if the next least significant bit of the inverse is equal to "0" and the least significant bit of the inverse is equal to "1", the "1" may be added by inverting both bits as shown in the second row of the truth table illustrated in FIG. 3. If the next to least significant bit of the inverse is "1" and the least significant bit of the inverse is "0", the "1" may be added by inverting the least significant bit as shown in the third row of the truth table illustrated in FIG. 3. None of these first three cases require the generation of a carry bit. However, if both the next to least and least significant bits of the inverse are "1", the addition of a "1" would cause a carry ripple and would require an additional level of adder to account for this carry ripple. Therefore, as shown in row four of the truth table in FIG. 3, the system of the present invention merely inverts both the next to least and least significant bits of the inverse and generates a carry bit in carry logic 44. The inversion of both the next to least and least significant bits of the inverse effectively subtracts "3" from the quantity stored in partial product generator 26. During the next pass through the multiplier array 12, when the next most significant portion is selected from the operand register 30 by the multiplexer 28, a "1" is inserted into the adder tree at bit position $b_y$ in block 46. Relative to the quantity of "3" which was subtracted by inverting the two least significant bits on the prior cycle, the insertion of the bit at bit position $b_y$ effectively adds the quantity "4" to the total. Due to the fact that $-3+4=+1$, the required addition of "1" is accomplished in two steps and the negation of the operand by inversion and the addition of "1" in the least significant bit position is accomplished.

FIG. 4 represents the similar case where a Booth recoded operand calls for the shifted and negated value of the operand stored in operand register 14 to be loaded into partial product generator 26. This occurrence would correspond to the fifth row in truth table 10 shown in FIG. 1 which calls for negative two times the quantity stored in operand register 14. Negative two times the quantity is accomplished by inverting and shifting one place to the left the bits of the quantity stored in operand register 14 and adding "2" to the shifted quantity. The truth table illustrated in FIG. 4 has only two possible situations as the shifted value of the quantity will always have a "0" in the least significant bit position represented by column B in FIG. 4. Once again, column A corresponds to the inverse of the least significant bit of the operand stored in operand register 14. When the least significant bit of the quantity stored in operand register 14 is a "0", the quantity of "2" may be added to the quantity stored in partial product generator 26 by merely inverting the next to least significant bit. This is illustrated by the first row of the truth table illustrated in FIG. 4. No generation of a carry bit is required in this case. However, if the least significant bit of the quantity stored in operand register 14 is a "1", the addition of the required quantity of "2" to the quantity stored in partial product generator 26 may cause a carry ripple. Accordingly, the next to least significant bit of the quantity stored in partial product generator 26 is inverted and a carry bit is generated in carry logic 44 as illustrated by the second row of the truth table illustrated in FIG. 4.

The inversion of the next to least significant bit effectively subtracts "2" from the quantity stored in partial product generator 26. During the subsequent iteration and pass through the multiplier circuit 12, carry logic 44 sets the bit position $b_y$ to effectively add "4" to the total product. The subtraction of "2" in the first iteration followed by the addition of "4" in the subsequent iteration accomplishes the required addition of "2" necessary for the negation of the operand as $-2+4=+2$. Accordingly, the negation of the operand by inverting the bits of operand and adding either "1" or "2" as required by the Booth recoded quantity is accomplished without the addition of an additional level of the adder tree.

It should be understood that due to the known requirements of the Booth recoding format, the operand stored in register 30 is normalized such that the final partial product of a total product cannot be negative as discussed previously with reference to implied bit 31 in FIG. 2. Therefore, the fact that the method and the system of the present invention rely on a subsequent iteration to complete the addition of the required quantities is not affected by the lack of a subsequent iteration associated with the final partial product.

It should be understood that the particular multiplier system 12 illustrated in FIG. 2 is shown solely for the purposes of teaching important technical advantages of the present invention and should not be construed to limit the teaching of the present invention to this or any embodiment. The selection of the data path widths and operand sizes are solely for the convenience of teaching the present invention and it should be understood that the teachings of the present invention are applicable to a wide variety of multiplier implementations. All of these different embodiments are intended to be included within the scope and spirit of the present invention as defined by the appended claims.

What is claimed is:

1. A multiplier for multiplying first and second operands using multiple passes through a multiplier array, comprising:

first storage circuitry for storing the first operand;

second storage circuitry for storing the second operand;

a plurality of partial product generators operable to receive data from said first and second storage circuitries;

circuitry for setting a selected bit position within one of said partial product generators to zero during a first pass through the multiplier array;

carry circuitry coupled to said circuitry for setting a selected bit position, said carry circuitry operable to store a carry bit indicating that said selected bit position has been set to zero; and circuitry, responsive to said carry circuitry, for adding in a subsequent pass through the multiplier array a one located in a bit position having a significance equal to twice said selected bit position.

2. The circuit of claim 1 and further comprising Booth recoding circuitry coupled to said partial product generators and operable to selectively cause said partial product generators to store quantities derived from the value of the second operand responsive to values of portions of the first operand.

3. The circuit of claim 1 and further a circuit comprising circuitry for setting a second bit position within said one of said partial product generators to zero during said first pass through the multiplier array, said second bit position having a significance equal to one half the significance of said selected bit position.

4. A circuit for negating a value of an operand of a multiplication operation requiring at least two passes through a multiplier array, comprising:

a partial product generator circuit operable to generate a partial product that, when summed with other partial products form at least a portion of a product of the multiplication operation;

circuitry coupled to said partial product generator for selectively inverting the operand;

circuitry coupled to said partial product generator for subtracting a first predetermined quantity from the inverted operand to yield a difference;

circuitry coupled to said partial product generator for summing said difference with said other partial products; and circuitry for adding a second predetermined quantity in a subsequent pass through the multiplier array such that the aggregate effective of inverting the operand, subtracting said first predetermined quantity and adding said second predetermined quantity comprises the required negation of the operand.

5. A method of negating a value of an operand of a multiplication operation requiring at least two passes through a multiplier array, comprising the steps of:

generating, using a partial product generator circuit, a partial product that, when summed with partial products generated in other passes through said multiplier array form at least a portion of a product of the multiplication operation;

selectively inverting the operand;

subtracting a first predetermined quantity from the inverted operand to yield a difference;

summing the difference with the other partial products; and adding a second predetermined quantity in a subsequent pass through the multiplier array such that the aggregate effect of inverting the operand, subtracting the first predetermined quantity and adding the second predetermined quantity comprises the required negation of the operand.

* * * * *